United States Patent
Feng et al.

(10) Patent No.: US 11,119,832 B2
(45) Date of Patent: Sep. 14, 2021

(54) METHOD AND DEVICE FOR IMPLEMENTING READ-WRITE LOCK REENTRY, TERMINAL AND STORAGE MEDIUM

(71) Applicant: BAIDU ONLINE NETWORK TECHNOLOGY (BEIJING) CO., LTD., Beijing (CN)

(72) Inventors: Kaiwen Feng, Beijing (CN); Zhuo Chen, Beijing (CN); Yuedong Dang, Beijing (CN); Ronggui Peng, Beijing (CN); Wanyu Bao, Beijing (CN); Zhongjun Ni, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 149 days.

(21) Appl. No.: 16/552,340

(22) Filed: Aug. 27, 2019

(65) Prior Publication Data
US 2020/0073728 A1    Mar. 5, 2020

(30) Foreign Application Priority Data
Aug. 28, 2018 (CN) .......................... 201810987084.0

(51) Int. Cl.
*G06F 9/46* (2006.01)
*G06F 9/52* (2006.01)
*G06F 9/50* (2006.01)

(52) U.S. Cl.
CPC ............ *G06F 9/524* (2013.01); *G06F 9/5005* (2013.01)

(58) Field of Classification Search
CPC ............................... G06F 9/524; G06F 9/5005
See application file for complete search history.

(56) References Cited

FOREIGN PATENT DOCUMENTS

| CN | 102662747 A | 9/2012 |
|---|---|---|
| CN | 104572568 A | 4/2015 |
| CN | 107391265 A | 11/2017 |
| CN | 108052391 A | 5/2018 |
| JP | S63307538 A | 12/1988 |

OTHER PUBLICATIONS

Chinese Patent Application No. 201810987084.0 First Office Action dated Apr. 27, 2020, 7 pages.
Chinese Patent Application No. 201810987084.0 English translation of First Office Action dated Apr. 27, 2020, 7 pages.

*Primary Examiner* — Gregory A Kessler
(74) *Attorney, Agent, or Firm* — Lathrop GPM LLP

(57) ABSTRACT

The embodiments of the present disclosure provide a method and a device for implementing read-write lock reentry, a terminal and a storage medium. The method includes: receiving a write lock request of a thread to a target resource; in response to determining that the target resource is in a write-lock-exclusive state, acquiring a historical write-lock thread to the target resource that is in the write-lock-exclusive state; in response to determining that the thread is identical to the historical write-lock thread, adding a new lock of the thread to the target resource.

9 Claims, 3 Drawing Sheets

METHOD AND DEVICE FOR IMPLEMENTING READ-WRITE LOCK REENTRY, TERMINAL AND STORAGE MEDIUM

CROSS-REFERENCE TO RELATED APPLICATION

This application claims priority to and benefits of Chinese Patent Application Serial No. 201810987084.0, filed with the State Intellectual Property Office of P. R. China on Aug. 28, 2018, the entire content of which is incorporated herein by reference.

TECHNICAL FIELD

The present disclosure relates to the field of computer technology, and more particularly, to a method and a device for implementing read-write lock reentry, a terminal and a storage medium.

BACKGROUND

Autopilot system is a system with high concurrency. At present, in order to ensure consistency of data at runtime, a large number of locks are employed to protect data in a critical zone, resulting in excessive lock waits that may cause a decrease in performance of the system.

A read-write lock is actually a special kind of spin lock, which divides the visitors of the shared resource into readers and writers. The readers and the writers may access the shared resource through a thread. The readers merely perform reading operations on the shared resource, and the writers merely perform writing operations on the shared resource. The writing operation refers to an operation of changing the state of public resource in the critical zone, and the reading operation refers to an operation of not changing the state of the public resource. Since the real-write lock has a write-lock-exclusive characteristic, the consistency of the data of the public resource and sharing characteristics of the read lock can be ensured. Therefore, reasonable use of the read-write lock can significantly improve the performance of the concurrent system and reduce the lock wait time on both sides during condition competition.

However, in some cases, for example, a complex operation may include a writing operation (A), a writing operation (B) and a reading operation (C). In order to ensure consistency of the data, lock protection may be performed on each of the three operations. For example, for A (writing) B (writing) C (reading), when the operation is performed, there is A writing locked→B writing locked→B writing unlocked→C reading locked→C reading unlocked→A writing unlocked. Due to the exclusive characteristic of the write lock, when A (writing) is locked, other subsequent operations cannot be performed, resulting in a deadlock phenomenon.

SUMMARY

Embodiments of the present disclosure provide a method for implementing read-write lock reentry, including: receiving a lock request of a thread to a target resource; in response to determining that the target resource is in a write-lock-exclusive state, acquiring a historical write-lock thread to the target resource that is in the write-lock-exclusive state; and in response to determining that the thread is identical to the historical write-lock thread, adding a new lock of the thread to the target resource.

Embodiments of the present disclosure provide a device for implementing read-write lock reentry, including: a receiving module, configured to receive a lock request of a thread to a target resource; an acquiring module, configured to acquire a historical write-lock thread to the target resource that is in a write-lock-exclusive state in response to determining that the target resource is in the write-lock-exclusive state; and a lock adding module, configured to add a new lock of the thread to the target resource in response to determining that the thread is identical to the historical write-lock thread.

Embodiments of the present disclosure provide a terminal, including: one or more processors; a storage device, configured to store one or more programs. When the one or more programs are executed by the one or more processors, the one or more processors are caused to implement the method for implementing read-write lock reentry according to the embodiments of the first aspect.

Embodiments of the present disclosure provide a storage medium having computer programs stored thereon. When the programs are executed by a processor, the method for implementing read-write lock reentry according to the embodiments of the first aspect is implemented.

BRIEF DESCRIPTION OF THE DRAWINGS

In order to illustrate the technical solutions of the embodiments of the present disclosure, drawings are provided in the embodiments and the drawings will be briefly described below. It should be understood that the following drawings only show certain embodiments of the present disclosure, and therefore should not be construed to limit the scope, and those skilled in the art may obtain other related drawings according to these drawings without inventive works.

DETAILED DESCRIPTION

Figure 1:
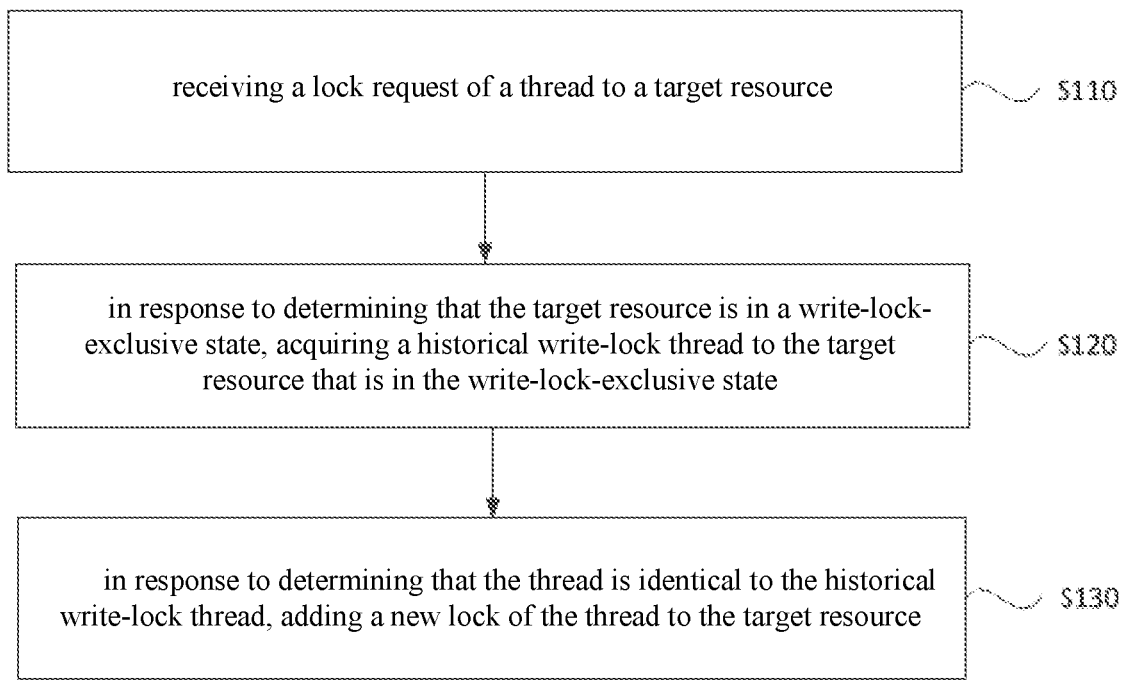
FIG. 1 is a flowchart of a method for implementing read-write lock reentry in a first embodiment of the present disclosure.

The present disclosure will be further described in detail below with reference accompanying drawings and embodiments. It should be understood that, specific embodiments described herein merely serve to explain the present disclosure, and are not construed to limit the present disclosure. In addition, it should be noted that, for ease of description, only some, but not all of the structures related to the present disclosure are illustrated in the drawings.

It should be noted that similar reference numerals and letters indicate similar items in the following accompanying drawings, and therefore, once an item is defined in one accompanying drawing, it is not necessary to further define and explain it in the subsequent accompanying drawings. Also, in the description of the present disclosure, the terms "first", "second", and the like are merely used to distinguishing in the description, and are not to be construed as indicating or implying relative importance.

First Embodiment

FIG. 1 is a flowchart of a method for implementing read-write lock reentry in the first embodiment of the present disclosure. Embodiments of the present disclosure are applicable to a case for avoiding deadlock caused by a write lock in a read-write lock. The method may be performed by a device for implementing read-write lock reentry according to an embodiment of the present disclosure. The device may be implemented in software and/or hardware and may be specifically disposed in a terminal (e.g., a control framework of a mobile carrier in an autopilot). As illustrated in FIG. 1, the method includes following steps.

At block S110, a lock request of a thread to a target resource is received.

The target resource refers to a shared resource in a critical zone that can be alternately used by threads, and may be, for example, a shared device, a shared memory, or the like. The critical zone refers to a program fragment configured to access the shared resource. The shared resource cannot be simultaneously accessed by a plurality of threads. For example, a plurality of algorithm modules such as a sensor module, a driving module, a sensing module, a control module and the like are required to simultaneously access a positioning module, thus threads corresponding to the sensor module, the driving module, the sensing module, and the control module form the critical zone.

The lock request refers to a request for adding a write lock or a read lock to the target resource in the critical zone sent to the terminal by any thread. Alternatively, the lock request may include an identification of the thread. The identification of the thread may include an ID, a serial number, or a name, or the like of the thread. It should be noted that different threads correspond to different identifications. In an embodiment, the identification of the thread is the ID of the thread.

At block S120, if the target resource is in a write-lock-exclusive state, a historical write-lock thread to the target resource that is in the write-lock-exclusive state is acquired.

Exclusive means that only one thread can hold a lock at a time. Correspondingly, the write-lock-exclusive state means that, when a thread adds a write lock to the target resource and other threads that attempt to add locks to the target resource are blocked before the write lock is unlocked. That is, the write-lock-exclusive state is a state in which the target resource is exclusively occupied by the thread. It should be noted that, due to a write-lock-exclusive characteristic in a read-write lock, when one thread writes to or modifies the target resource, other threads cannot obtain an authority for accessing the target resource, thereby ensuring the consistency of data of the target resource.

It should be noted that the target resource in the critical zone may be in three states, i.e., the write-lock-exclusive state, a read-lock-sharing state, and an unlocked state. The read-lock-sharing state refers to that, when one thread adds a read lock to the target resource, other threads that attempt to add a read lock to the target resource can obtain the read lock, and other threads that attempt to add a write lock to the target resource are blocked. In other words, in the read-lock-sharing state, a plurality of threads can concurrently add read locks to the target resource, but a write lock may not be added to the target resource. The unlocked state refers to a state in which no lock is added to the target resource. That is, all the locks added to the target resource are unlocked. In the unlocked state, when receiving a request from any thread for adding a write lock or a read lock to the target resource, the terminal response to the request, i.e., the terminal adds the write lock or the read lock of the thread to the target resource.

A historical write-lock thread refers to a thread that makes the target resource in the write-lock-exclusive state after a write lock is added to the target resource. The historical write-lock thread may also be a last thread of a thread corresponding to the write lock request. For example, related information of the historical write-lock thread, such as the ID of the historical write-lock thread, may be stored in a log file of the terminal, thus it is convenient to acquire for the terminal at any time.

In detail, when the terminal receives the lock request of any thread to the target resource in the critical zone from any thread, the terminal determines a current state of the target resource. When the target resource is in the write-lock-exclusive state, the historical write-lock thread to the target resource in the write-lock-exclusive state is acquired from the log file. When the target resource is in the read-lock-sharing state and the current lock request of the thread is a read lock request, a read lock of the thread is added to the target resource. When the current lock request of the thread is a write lock request, the current lock request of the thread is rejected. When the target resource is in the unlocked state, a write lock or a read lock is added to the target resource.

In detail, for example, when the current lock request is the write lock request, after receiving the current write lock request of any thread to the target resource, the method may further include follows. When the target resource is in the unlock state, a write lock of the thread is added to the target resource, and the thread is taken as the write-lock thread to the target resource.

Correspondingly, for example, when the current lock request is the read lock request, after receiving the current read lock request of any thread to the target resource, the method may further include follows. When the target resource is in the unlock state, a read lock of the thread is added to the target resource, and the thread is taken as the read-lock thread to the target resource.

At block S130, when the thread is identical to the historical write-lock thread, a new lock of the thread is added to the target resource.

The new lock may be a write lock or a read lock.

In detail, when the target resource is in the write-lock-exclusive state, an ID of the thread corresponding to a current write lock request is compared with an ID of the historical write-lock thread after obtaining the historical write-lock thread to the target resource in the write-lock-exclusive state. If the two IDs are identical, it indicates that the historical write-lock thread and the thread corresponding to the current write lock request are same, and a write lock or a read lock is added to the target resource in the same thread, so that read-write lock reentry of the same thread can be realized, thus avoiding a deadlock problem and improving system performance. If the two IDs are different, it indicates that the historical write-lock thread and the thread corresponding to the current write lock request are different threads. The terminal may reject the current lock request of the thread according to the write-lock-exclusive characteristic, regardless of whether the current lock request of the thread is a write lock request or a read lock request.

For example, after obtaining the historical write-lock thread to the target resource in the write-lock-exclusive state, the method may further include: when the thread is different from the historical write-lock thread, rejecting the current lock request of the thread.

It should be noted that, with the existing read-write lock, when the target resource is in the write-lock-exclusive state, the read lock or the write lock of any thread may be blocked. However, in this embodiment, when the target resource is in the write-lock-exclusive state, one thread can perform read-write lock reentry on the target resource for several times, and the write locks of different threads are blocked, avoiding the deadlock problem. For example, a complex operation of a thread may include a writing operation (A), a writing operation (B) and a reading operation (C). In order to ensure consistency of data, lock protection may be performed on each of the three operations. For example, for A (writing) B (writing) C (reading), when the operation is performed, there is A writing locked→B writing locked→B writing unlocked→C reading locked→C reading unlocked→A writing unlocked. Since the "A writing locked" may make the target resource in the write-lock-exclusive state, and the "B writing locked" and the "C reading locked" can be added in the same thread, so that the operation can be executed without causing a stop phenomenon (i.e., dead lock) after the "A writing locked".

In addition, when the target resource is in a read-lock-exclusive state, multi-thread read lock reentry is supported, which improves the system performance.

With the technical solution of the embodiments of the present disclosure, after receiving the write lock request of the thread to the target resource, the current state of the target resource is determined. If the target resource is in a write-lock-exclusive state, the historical write-lock thread to the target resource that is in the write-lock-exclusive state is acquired, and if the thread is identical to the historical write-lock thread, i.e., the thread and the historical write-lock thread are same, the new lock of the thread is added to the target resource. Write-lock reentry in a same thread may be realized to avoid deadlock problem and to improve system performance.

Second Embodiment

Figure 2:
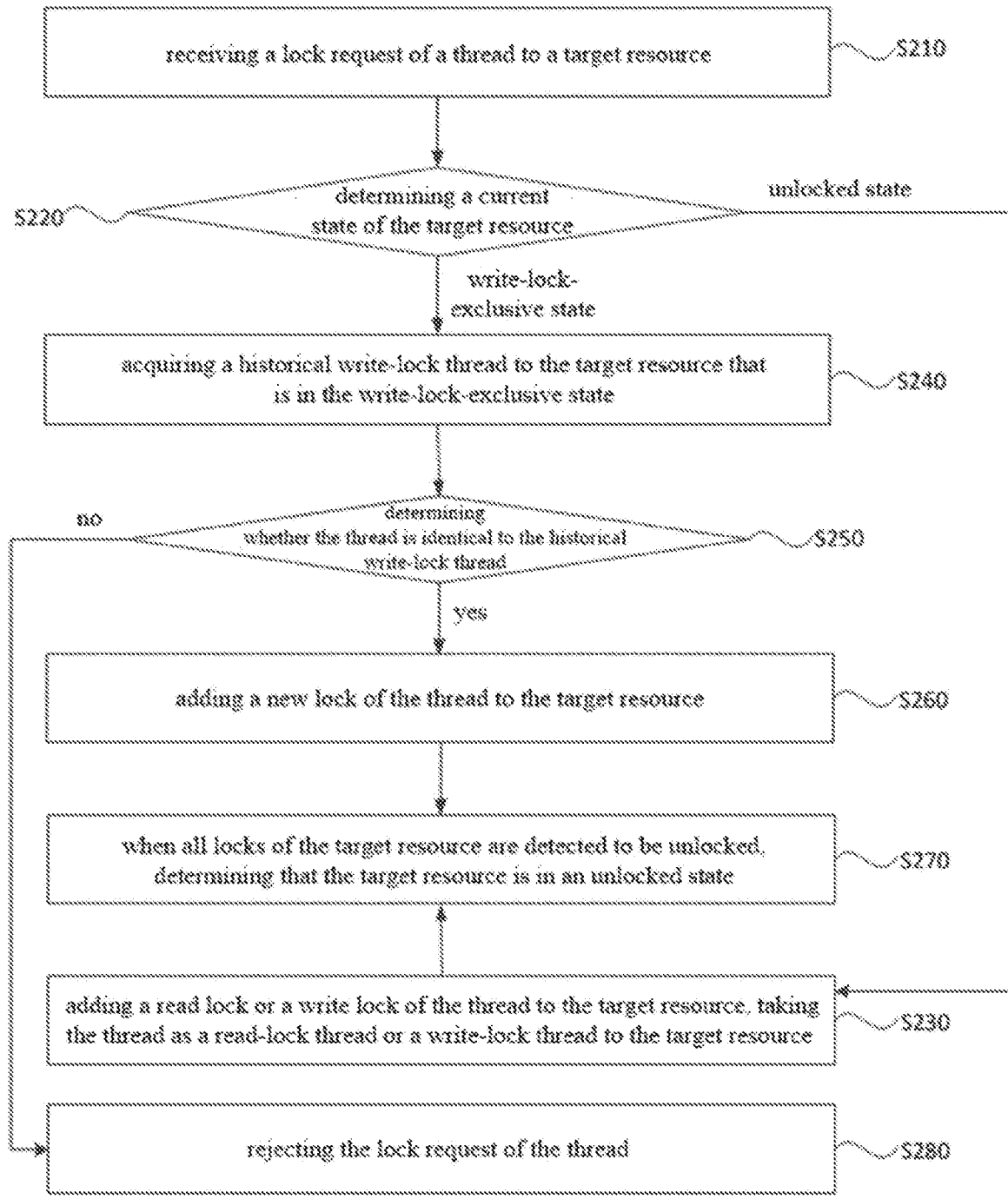
FIG. 2 is a flowchart of a method for implementing read-write lock reentry in a second embodiment of the present disclosure.

FIG. 2 is a flowchart of a method for implementing read-write lock reentry in the second embodiment of the present disclosure. As illustrated in FIG. 2, the method in this embodiment includes the following steps.

At block S210, a lock request of a thread to a target resource is received.

The lock request may be a write lock request or a read lock request.

At block S220, a current state of the target resource is determined. When the target resource is in a non-locked state, an action at block S230 is executed. When the target resource is in a write-lock-exclusive state, an action at block S240 is executed.

At block S230, a read lock or a write lock of the thread is added to the target resource, the thread is taken as a read-lock thread or a write-lock thread to the target resource, and an action at block S270 is executed.

If the target resource is in an unlocked state and the lock request is the write lock request, the write lock of the thread is added to the target resource, and the thread is taken as the write-lock thread to the target resource. Correspondingly, if the target resource is in an unlocked state and the lock request is the read lock request, the read lock of the thread is added to the target resource, and the thread is taken as the read-lock thread to the target resource.

At block S240, a historical write-lock thread to the target resource that is in the write-lock-exclusive state is acquired.

At block S250, it is determined whether the thread is identical to the historical write-lock thread. When the thread is identical to the historical write-lock thread, an action at block S260 is executed, and when the thread and the historical write-lock thread are different, an action at block S280 is executed.

At block S260, a new lock of the thread is added to the target resource.

For example, after adding the new lock of the thread to the target resource, the method may further include: receiving and responding to an access instruction of the thread to the target resource.

The access instruction refers to an instruction for accessing the target resource. The access instruction may include an identification of the target resource, an identification of the thread, and an access duration. The identification of the target resource may be a name, an address of the target resource, or the like. The access duration is used to inform the terminal of an upper limit of time required for the thread to access the target resource. It should be noted that adding access duration in the access instruction can ensure that the thread does not occupy the target resource for too long.

In detail, when the new lock is a write lock, the access instruction sent by the thread is received after the thread adds the write lock to the target resource, and the access instruction is responded to enable the thread to perform a writing operation on the target resource. A write lock in a read-write lock corresponds to a writing operation. A read lock corresponds to a reading operation. The writing operation refers to an operation of changing a state of the target resource in a critical zone, and the reading operation refers to an operation of not changing the state of the target resource.

Correspondingly, when the new lock is the read lock, the access instruction sent by the thread is received after the thread adds the read lock to the target resource, and the access instruction is responded to enable the thread to perform a read operation on the target resource.

It should be noted that even if the read lock of the thread is added to the target resource, other threads attempting to add a read lock to the target resource are blocked, so the target resource is in a read-lock exclusive state. Only one thread may add the read lock or the write lock to the target resource.

At block S270, when all locks of the target resource are detected to be unlocked, it is determined that the target resource is in an unlocked state.

The unlocked state refers to a state in which no lock is added to the target resource. In the unlocked state, if the terminal receives a request of a thread for adding a write lock or a read lock to the target resource, the terminal respond to the request. That is, the write lock or the read lock of the thread is added to the target resource.

For example, after the write lock of the thread is added to the target resource, if the thread occupies the target resource all the time, it is determined that the target resource is currently in the unlocked state when the terminal detects that the write lock of the thread added to the target resource is unlocked.

After the write lock of the thread is added to the target resource, the read lock is added to the target resource. When the terminal detects that the write lock and the read lock of the thread added to the target resource are unlocked and the target resource is not added with locks by other threads, i.e., all the locks added to the target resource are unlocked, it can be determined that the target resource is currently in the unlocked state.

At block S280, the lock request of the thread is rejected.

With the technical solution of the embodiments of the present disclosure, after receiving the write lock request of the thread to the target resource, the current state of the target resource is determined. If the target resource is in a write-lock-exclusive state, the historical write-lock thread to the target resource that is in the write-lock-exclusive state is acquired, and if the thread is identical to the historical write-lock thread, i.e., the thread and the historical write-lock thread are same, the new lock of the thread is added to the target resource. Write-lock reentry in a same thread may be realized to avoid deadlock problem and to improve system performance.

Third Embodiment

Figure 3:
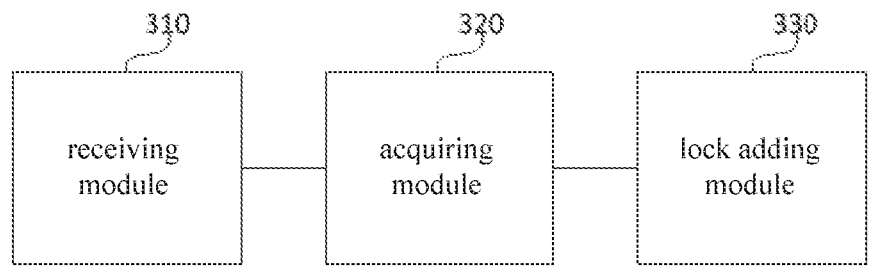
FIG. 3 is a schematic diagram of a device for implementing read-write lock reentry in a third embodiment of the present disclosure.

FIG. 3 is a schematic diagram of a device for implementing read-write lock reentry in the third embodiment of the present disclosure.

The device can implement the method for implementing read-write lock reentry according to any embodiment of the present disclosure, and has the corresponding functional modules and beneficial effects of the implemented method. As illustrated in FIG. 3, the device includes a receiving module 310, an acquiring module 320, and a lock adding module 330.

The receiving module 310 is configured to receive a lock request of a thread to a target resource.

The acquiring module 320 is configured to acquire a historical write-lock thread to the target resource that is in a write-lock-exclusive state if the target resource is in the write-lock-exclusive state.

The lock adding module 330 is configured to add a new lock of the thread to the target resource if the thread is identical to the historical write-lock thread.

With the technical solution of the embodiments of the present disclosure, after receiving the write lock request of the thread to the target resource, the current state of the target resource is determined. If the target resource is in a write-lock-exclusive state, the historical write-lock thread to the target resource that is in the write-lock-exclusive state is acquired, and if the thread is identical to the historical write-lock thread, i.e., the thread and the historical write-lock thread are same, the new lock of the thread is added to the target resource. Write-lock reentry in a same thread may be realized to avoid deadlock problem and to improve system performance.

In one aspect, the lock adding module 330 is further configured to, after receiving the write-lock request of the thread to the target resource by any thread, adding a write lock of the thread to the target resource, and taking the thread as the write-lock thread to the target resource if the target resource is in an unlock state.

In another aspect, the device further includes: a request rejection module, configured to reject the lock request of the thread if the thread is different from the historical write-lock thread after acquiring the historical write-lock thread to the target resource that is in the write-lock-exclusive state.

In another aspect, the device further includes: a determining module, configured to determine that the target resource is in an unlocked state if it is detected that all locks of the target resource are unlocked after adding the new lock of the thread to the target resource.

In another aspect, the device further includes: a response module, configured to receive and respond to the access instruction of the thread to the target resource after adding the new lock of the thread to the target resource.

Fourth Embodiment

Figure 4:
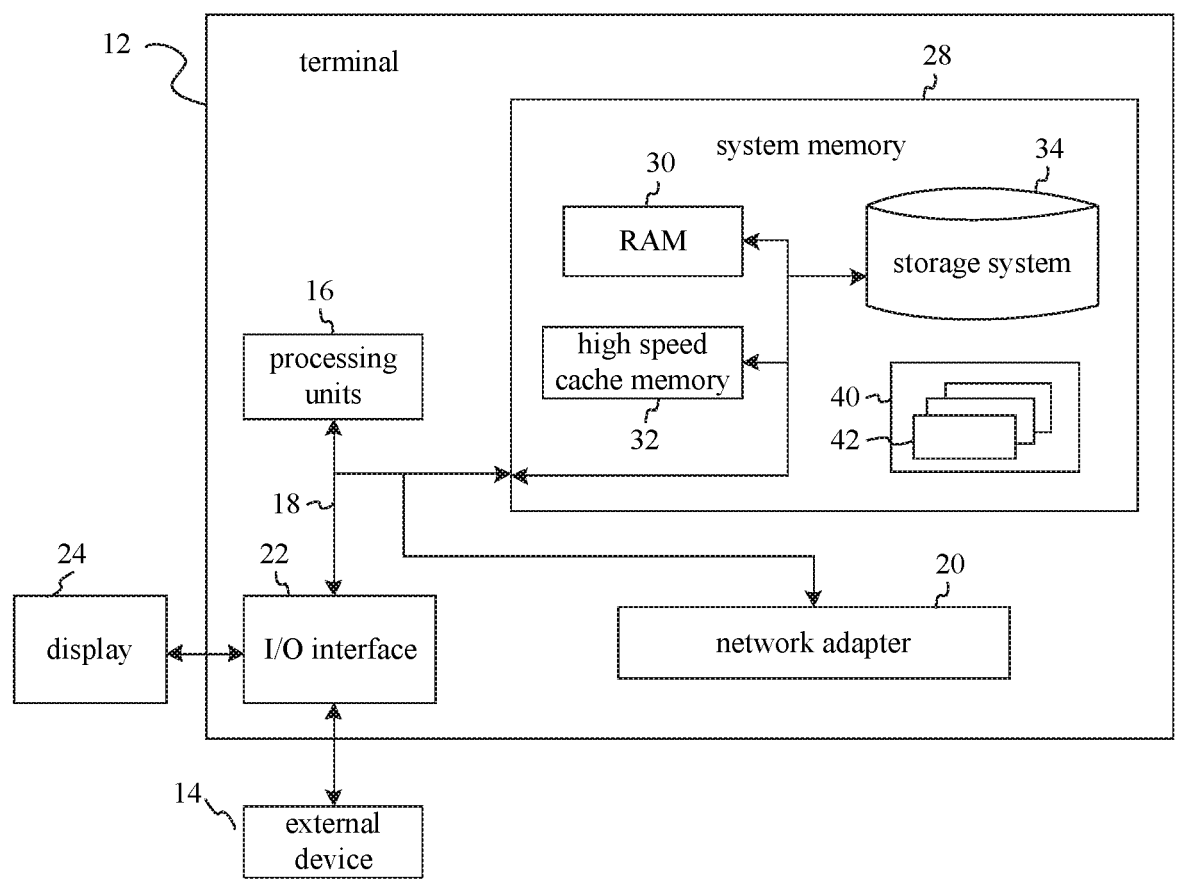
FIG. 4 is a schematic diagram of a terminal in a fourth embodiment of the present disclosure.

FIG. 4 is a schematic diagram of a terminal in the fourth embodiment of the present disclosure. FIG. 4 illustrates a block diagram of an exemplary terminal 12 suitable for realizing implementations of the present disclosure. The terminal 12 illustrated in FIG. 4 is merely an example and should not be understood as any limitation on the function and usage scope of the embodiments of the present disclosure. The terminal 12 is a computing device that functions as a node of a block chain system.

As illustrated in FIG. 4, the terminal 12 is embodied in a form of a general-purpose computer device. Components of the terminal 12 may include, but are not limited to, one or more processors or processing units 16, a system memory 28, and a bus 18 that connects various system components, including the system memory 28 and the processing unit 16.

The bus 18 represents one or more of types of several bus structures, including a memory bus or a memory controller, a peripheral bus, a graphic acceleration port, a processor or a local bus using any bus structure in the plurality of bus structures. For example, these structures include but not limited to an industry standard architecture (ISA) bus, a micro-channel architecture (MCA) bus, an enhanced ISA bus, a video electronic standards association (VESA) local bus, and a peripheral component interconnect (PCI) bus.

The terminal 12 includes various computer system readable mediums. These mediums may be any usable medium that may be accessed by the terminal 12, including volatile and non-volatile mediums, removable and non-removable mediums.

The system memory 28 may include a computer system readable medium in a form of volatile memory, such as a random access memory (RAM) 30 and/or a high-speed cache memory 32. The terminal 12 may further include other transitory/non-transitory storage media and movable/unmovable storage media. By way of example only, the storage system 34 may be configured to read and write non-removable, non-volatile magnetic media (not shown in FIG. 4, commonly referred to as "hard drive"). Although not illustrated in FIG. 4, a magnetic disk driver for reading from and writing to a removable and non-volatile magnetic disk (e.g. "floppy disk"), and an optical driver for reading from and writing to a removable and non-volatile optical disk (e.g. a compact disc read only memory (CD-ROM, a digital video disc read only Memory (DVD-ROM), or other optical media) may be provided. In these cases, each driver may be connected to the bus 18 via one or more data medium interfaces. The memory 28 may include at least one program product, which has a set (for example at least one) of program modules configured to perform the functions of embodiments of the present disclosure.

A program/utility tool 40, having a set (at least one) of program modules 42, may be stored in, for example, the system memory 28. Such program modules 42 may include but not limited to an operating system, one or more application programs, other program modules, and program data. Each or any combination of these examples may include an implementation of a networking environment. The program module 42 usually executes functions and/or methods described in embodiments of the present disclosure.

The terminal 12 may communicate with one or more external devices 14 (such as a keyboard, a pointing device, and a display 24, etc.), may further communicate with one or more devices enabling a user to interact with the terminal 12, and/or may communicate with any device (such as a network card, and a modem, etc.) enabling the terminal 12 to communicate with one or more other computer devices. Such communication may be achieved by an Input/Output (I/O) interface 22. In addition, in the terminal 12 of the present embodiment, the display 24 does not exist as an independent individual, but is embedded in a mirror surface. When the display surface of the display 24 does not display anything, the display surface of the display 24 and the mirror surface are visually integrated. Moreover, the terminal 12 may further communicate with one or more networks (such as a local area network (LAN), a wide area network (WAN) and/or a public network such as the Internet) via a network adapter 20. As illustrated in FIG. 4, the network adapter 20 communicates with other modules of the terminal 12 via the bus 18. It should be understood that, although not illustrated in FIG. 4, other hardware and/or software modules may be used in combination with the terminal 12, including but not limited to: microcode, device drivers, redundant processing units, external disk drive arrays, RAID (Redundant Array of Independent Disks) systems, tape drives, and data backup storage systems, etc.

The processing unit 16, by operating programs stored in the system memory 28, performs various function applications and data processing, for example implementing the method provided for implementing read-write lock reentry in embodiments of the present disclosure.

Fifth Embodiment

The embodiments of the present disclosure provide a storage medium having computer programs stored thereon. When the program is executed by a processor, the method for implementing read-write lock reentry according to the embodiments of the present disclosure is performed.

The computer storage medium of the embodiments of the present disclosure may employ any combination of one or more computer readable mediums. The computer readable medium may be a computer readable signal medium or a computer readable storage medium. The computer readable storage medium may be, for example, but not limited to, an electronic, magnetic, optical, electromagnetic, infrared, or semiconductor system, apparatus, device, component or any combination of the above. A more specific example of the computer readable storage medium may include (a non-exhaustive list): an electrical connection having one or more wires, a portable computer disk, a hard disk, a random access memory RAM, a read only memory ROM, an erasable programmable read-only memory (EPROM or flash memory), an optical fiber, a portable compact disk read-only memory (CD-ROM), an optical storage component, a magnetic storage device, or any suitable combination thereof. In the present disclosure, the computer readable storage medium may be any tangible medium that may contain or store a program. The program may be used by or in combination with an instruction execution system, apparatus or device.

A computer readable signal medium may include a data signal that is propagated in a baseband or as part of a carrier carrying computer readable program codes. The data signal propagated in this manner may adopt a plurality of forms including, but not limited to, an electromagnetic signal, an optical signal, or any suitable combination thereof. The computer readable signal medium may also be any computer readable medium other than the computer readable storage medium. The computer readable medium may send, propagate, or transmit a program utilized by an instruction execution system, apparatus, or device or a connection thereof.

Program codes contained in the computer readable medium may be transmitted over any suitable media, including but not limited to a wireless connection, a wired connection, a fiber optic cable, RF, or any suitable combination thereof.

Computer program codes for performing the operations of the present disclosure may be written in one or more programming languages, or a combination thereof, including an object-oriented programming language such as Java, Smalltalk, C++, and conventional procedural programming languages such as the C language or the like. The program codes may be entirely executed on the user's computer, partly executed on the user's computer, executed as a stand-alone software package, executed partly on the user's computer and partly on a remote computer, or entirely executed on the remote computer or the terminal. In a case of the remote computer, the remote computer may be connected to the user's computer or an external compute (such as using an Internet service provider to connect over the Internet) through any kind of network, including a local area network (LAN) or a wide area network (WAN).

It should be noted that the above are only preferred embodiments of the present disclosure and the technical principles applied thereto. Those skilled in the art should appreciate that the present disclosure is not limited to the specific embodiments described herein, and that various obvious modifications, readjustments and substitutions may be made without departing from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for implementing read-write lock reentry, comprising:
  receiving a lock request of a thread to a target resource;
  in response to determining that the target resource is in a write-lock-exclusive state, acquiring a historical write-lock thread to the target resource that is in the write-lock-exclusive state;
  in response to determining that the target resource is in an unlocked state, adding a write lock of the thread to the target resource and taking the thread as a write-lock thread to the target resource under as case that the lock request is a write-lock request, and adding a read lock of the thread to the target resource and taking the thread as a read-lock thread to the target resource under a case that the lock request is a read-lock request;
  in response to determining that ID of the thread is identical to ID of the historical write-lock thread, adding a new lock of the thread to the target resource; and
  in response to determining that the ID of thread is different from the ID of the historical write-lock thread, rejecting the lock request of the thread.

2. The method according to claim 1, after adding the new lock of the thread to the target resource, further comprising:
in response to detecting that all locks of the target resource are unlocked, determining that the target resource is in an unlocked state.

3. The method according to claim 1, after adding the new lock of the thread to the target resource, further comprising:
receiving and responding to an access instruction of the thread to the target resource.

4. A terminal, comprising:
one or more processors;
a storage device, configured to store one or more programs; and
wherein, when the one or more programs are executed by the one or more processors, the one or more processors are caused to implement a method for implementing read-write lock reentry, the method comprising:
receiving a lock request of a thread to a target resource;
in response to determining that the target resource is in a write-lock-exclusive state, acquiring a historical write-lock thread to the target resource that is in the write-lock-exclusive state;
in response to determining that the target resource is in an unlocked state, adding a write lock of the thread to the target resource and taking the thread as a write-lock thread to the target resource under as case that the lock request is a write-lock request, and adding a read lock of the thread to the target resource and taking the thread as a read-lock thread to the target resource under a case that the lock request is a read-lock request;
in response to determining that ID of the thread is identical to ID of the historical write-lock thread, adding a new lock of the thread to the target resource; and
in response to determining that the ID of thread is different from the ID of the historical write-lock thread, rejecting the lock request of the thread.

5. The terminal according to claim 4, after adding the new lock of the thread to the target resource, further comprising:
in response to detecting that all locks of the target resource are unlocked, determining that the target resource is in an unlocked state.

6. The terminal according to claim 4, after adding the new lock of the thread to the target resource, further comprising:
receiving and responding to an access instruction of the thread to the target resource.

7. A non-transitory storage medium having computer programs stored thereon, wherein when the programs are executed by a processor, a method for implementing read-write lock reentry is implemented, the method comprising:
receiving a lock request of a thread to a target resource;
in response to determining that the target resource is in a write-lock-exclusive state, acquiring a historical write-lock thread to the target resource that is in the write-lock-exclusive state;
in response to determining that the target resource is in an unlocked state, adding a write lock of the thread to the target resource and taking the thread as a write-lock thread to the target resource under as case that the lock request is a write-lock request, and adding a read lock of the thread to the target resource and taking the thread as a read-lock thread to the target resource under a case that the lock request is a read-lock request;
in response to determining that ID of the thread is identical to ID of the historical write-lock thread, adding a new lock of the thread to the target resource; and
in response to determining that the ID of thread is different from the ID of the historical write-lock thread, rejecting the lock request of the thread.

8. The non-transitory storage medium according to claim 7, after adding the new lock of the thread to the target resource, further comprising:
in response to detecting that all locks of the target resource are unlocked, determining that the target resource is in an unlocked state.

9. The non-transitory storage medium according to claim 7, after adding the new lock of the thread to the target resource, further comprising:
receiving and responding to an access instruction of the thread to the target resource.

* * * * *